Jan. 2, 1968     J. W. DES CHAMPS     3,361,011
CONTROL UNIT FOR ENGINE AND FORWARD AND REVERSE DRIVE
Filed Jan. 7, 1966                            2 Sheets-Sheet 1
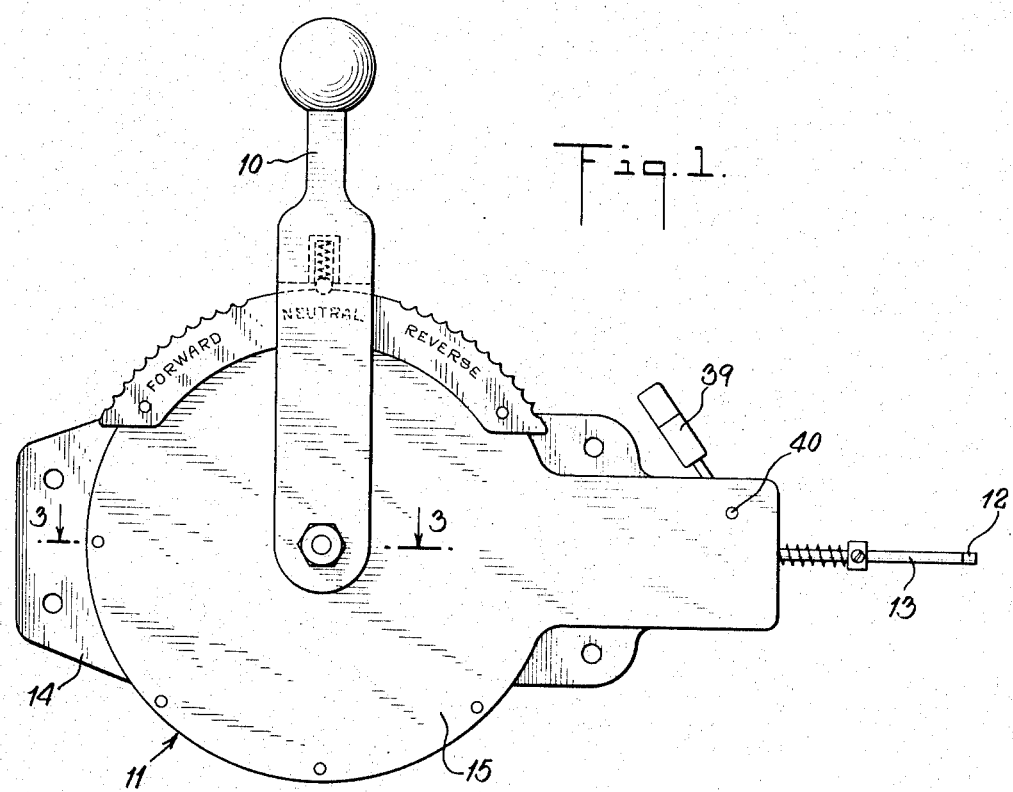
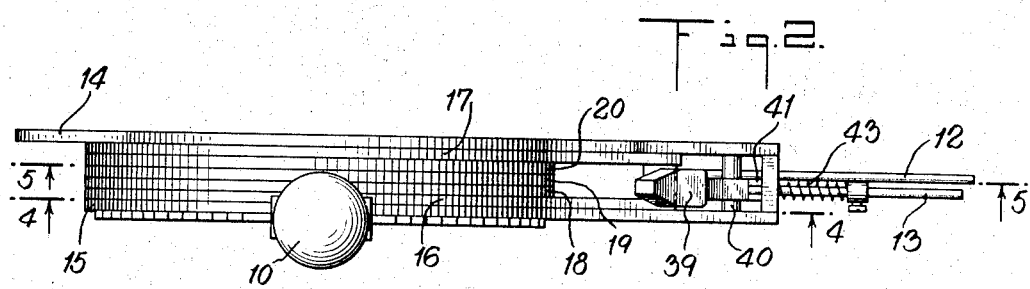
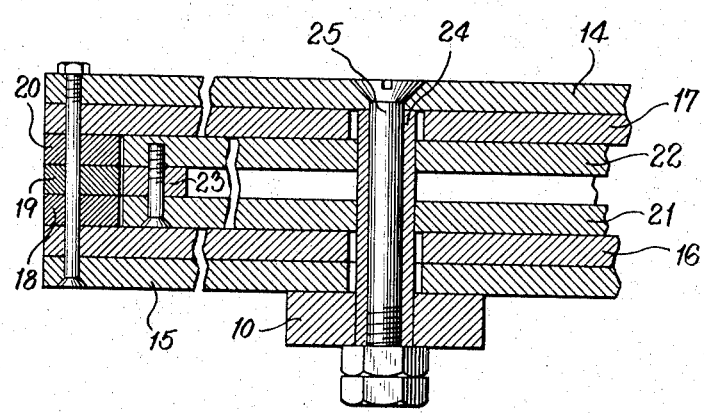
INVENTOR
JAMES W. DES CHAMPS
BY
ATTORNEY

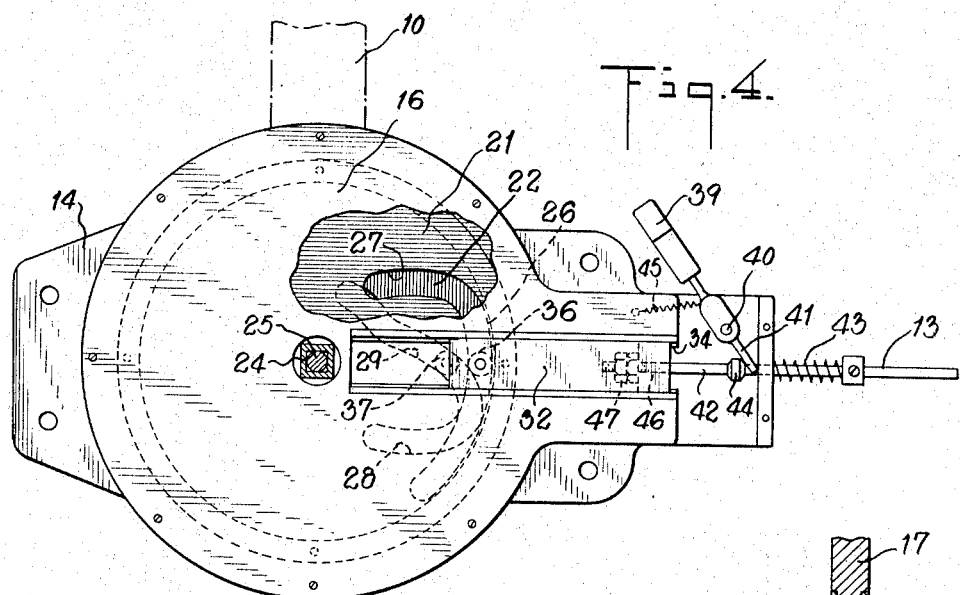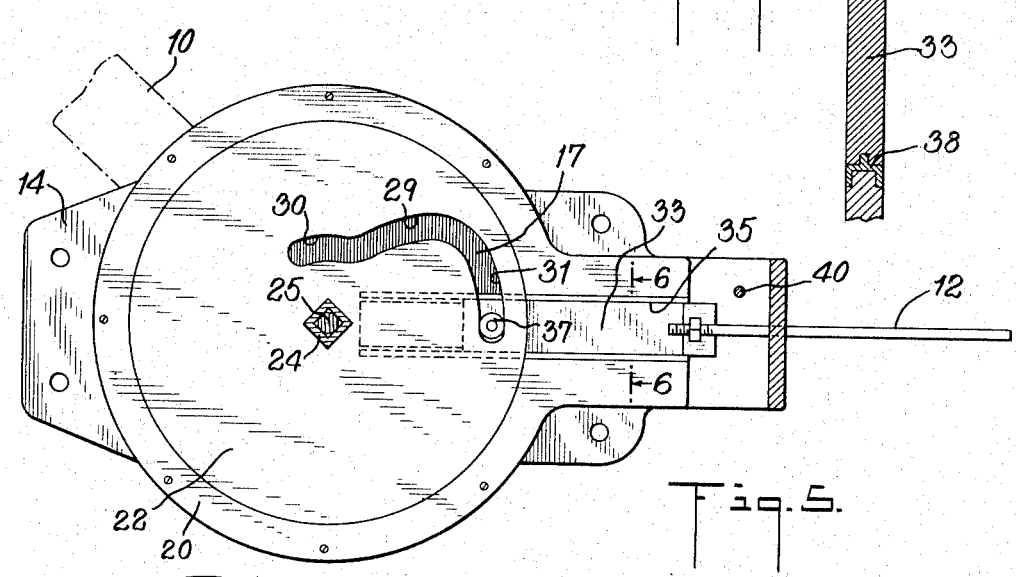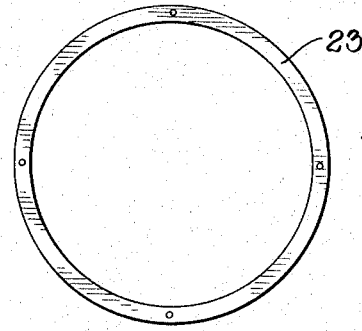

United States Patent Office 3,361,011
Patented Jan. 2, 1968

3,361,011
CONTROL UNIT FOR ENGINE AND FORWARD
AND REVERSE DRIVE
James W. Des Champs, Arroyo 1083,
Buenos Aires, Argentina
Filed Jan. 7, 1966, Ser. No. 519,325
1 Claim. (Cl. 74—876)

ABSTRACT OF THE DISCLOSURE

Control of both the engine and forward and reverse drive is embodied all in a single unitary structure adapted to be mounted as such in any convenient location on a boat or other vehicle.

---

The invention herein disclosed is a control unit for effecting forward and reverse drive of vehicles or other objects and related control of the power source.

Objects of the invention have been to provide a simple, substantial and practical form of apparatus for such purpose in a unitary form readily applicable to present day power installations.

These and other desirable objects have been accomplished by the novel features of construction, combination and relation of parts, hereinafter described and illustrated by example in accompanying drawings.

While these drawings illustrate a present practical embodiment of the invention, it is to be understood that structure may be modified and changed as regards the immediate illustrations; all within the true intent and scope of the invention, as hereinafter defined and claimed.

FIG. 1 is a front view of the complete unit in neutral position.

FIG. 2 is a top plan view of the same.

FIG. 3 is an enlarged broken sectional detail on substantially the plane of line 3—3, FIG. 1.

FIG. 4 is a sectional view with front cover of the casing removed, as on line 4—4 of FIG. 2, with broken lines showing both operating cams in neutral position.

FIG. 5 is a similar view taken on line 5—5 of FIG. 2 and showing the gear shift cam in forward drive position.

FIG. 6 is an enlarged sectional detail of the gear shift slide taken on line 6—6 of FIG. 5.

FIG. 7 is a detail of the ring interposed as a spacer between the two cams.

Externally, the unit may appear as in FIGS. 1 and 2, with a single control lever 10, shiftable over a cam housing 11, from a neutral to forward and reverse and throttle accelerating positions and connections 12 and 13 extending to forward-reverse gear drive mechanism and to engine throttle respectively.

For simplicity of manufacture and assembly, the casing may be made up of a back plate 14, constructed for mounting the device in convenient place on a boat or other conveyance, and a front, cover plate 15, spaced by front and back guide plates 16, 17 and by interposed spacing rings, 18, 19, 20, providing a flat circular chamber, for the throttle and gear shift operating cams 21, 22.

These cams are shown as flat discs secured together and spaced by an intermediate ring 23 and both keyed on a square sleeve 24, mounted to rotate on a stationary supporting shaft or stud 25.

The throttle cam 21 has a cam groove formed with an intermediate "neutral" portion 26, substantially concentric with the axis of rotation and active end portions 27, 28, extending from the concentric portion toward the center, the broken lines in FIG. 4 indicating the portion 28 as a continuation of the concentric portion 26.

The gear cam 22 is shown in FIG. 5 as having a cam groove with an intermediate neutral portion 29, and oppositely extended active end portions 30, 31, shaped to effect the required gear shifting movements in opposite directions.

The operating connections include in this instance, flat slides 32, 33, operating in guideway slots 34, 35, in the guide plates 16 and 17, and carrying at their inner ends rollers 36 and 37, tracking in the cam grooves, identified as 26 and 29.

To insure free sliding action of these connections, the slides may be guided and supported on tracks provided at the edges of the guide slots, as shown at 38, FIG. 6.

The control lever 10 is shown in FIG. 3 as keyed on the square section cam sleeve 24, so that both cams will turn with movement of the hand lever.

The cams are designed, as illustrated, so that with movement from a neutral, engine idling, intermediate or inactive position, they will effect necessary gear shift movement, either forward or reverse, and substantially complete such action before starting throttle opening or accelerating movement.

This insures idling of the engine until the mechanism is put into forward or reverse gear and enables operation of the engine then at any desired speed for such forward or reverse drive.

To enable warm-up or testing of the engine at any time without having to go through gear shift operations, there is provided in the illustration a separate throttle control lever 39, pivoted at 40, between an extension of the front and back plates, having a fork 41, engaging over the wire or rod forming portion 42 of the throttle connection, positioned when operated against the tension of return spring 43 to engage abutment shoulder 44, thus to pull on this rod to open the throttle against the tension of return spring 45.

This independent movement of the throttle operating connection is permitted by the rod 42, having a sliding bearing at 46, in the end of the throttle actuating slide 32.

Stop nuts 47, on the inner end of rod 42, enable fine adjustment of the throttle operating connections.

All necessary structure is combined in a simple, compact unit, which may be readily mounted where most convenient for such a control.

While both controls are shown extending in the same direction, it will be understood that the cams and cam followers illustrated, may be arranged to extend the operating connections out of the casing at different selected angles, to suit the placement of different accelerator and gear shift mechanisms.

The double ended cam serves to shift the throttle connection in the same direction with movement of the cams in opposite directions, whereas the gear shaft cam is shown as operating to shift that connection in opposite directions, with movement of the cam in opposite directions.

The single direction movement of the throttle connection with the interposed lost motion spring connection enables the free throttle adjustment independently of the cam mechanism.

To simplify construction and reduce cost, the control lever may be connected directly to the cams and the cams be mounted for unitary rotation with the lever.

While cams are shown for effecting the two operations of engine and transmission control, it is contemplated that additional cams and related mechanism may be incorporated for effecting other controls, as for signal apparatus and the like.

The slides 32, 33 may be made in other than the flat shapes shown and guides 38 be used or not according to good engineering practice.

The housing and cam disks may be cast or otherwise made up without need for spacing rings 18, 19, 20 and 23.

And it will be apparent that other changes in the interest of simplicity and economy may be made within the spirit and scope of the invention.

What is claimed is:

1. A control unit for effecting forward and reverse drive and throttle control in such drive in either direction, comprising a double ended throttle cam having an intermediate neutral portion for idling position of the throttle and generally identical engine accelerating cam slopes at opposite ends of the same, a gear shift cam having an intermediate neutral section and forward and reverse effecting cam slopes at opposite ends of the same, a cam follower cooperating with said throttle cam, throttle operating connections extending from said throttle cam follower, a cam follower cooperating with said gear shift cam, gear shift operating connections extending from the gear shift follower, and manually operable means for simultaneously shifting both said cams in opposite directions from said intermediate neutral positions, said manually operable means including a supporting casing, an operating handle pivotally mounted in said casing and shiftable in opposite directions from an intermediate "NEUTRAL" to "FORWARD" and "REVERSE" positions, said cams being mounted to rotate on the pivotal axis of and fixedly connected to turn with said handle, and slides mounted to travel in the casing radially in respect to said pivotal axis, said cam followers and operating connections being connected with said slides, whereby all forward and reverse and engine control may be directly effected by simple forward and reverse movements of said cam operating handle.

References Cited

UNITED STATES PATENTS

| | | | |
|---|---|---|---|
| 3,130,598 | 4/1964 | Burnham | 122—.096 |
| 3,139,767 | 7/1964 | Shimanckas | 74—472.2 |
| 3,309,938 | 3/1967 | Pervier | 74—472.2 |

DONLEY J. STOCKING, *Primary Examiner.*

H. S. LAYTON, *Assistant Examiner.*